P. S. BURDITT.
HARVESTER-RAKE.
No. 174,189. Patented Feb. 29, 1876.
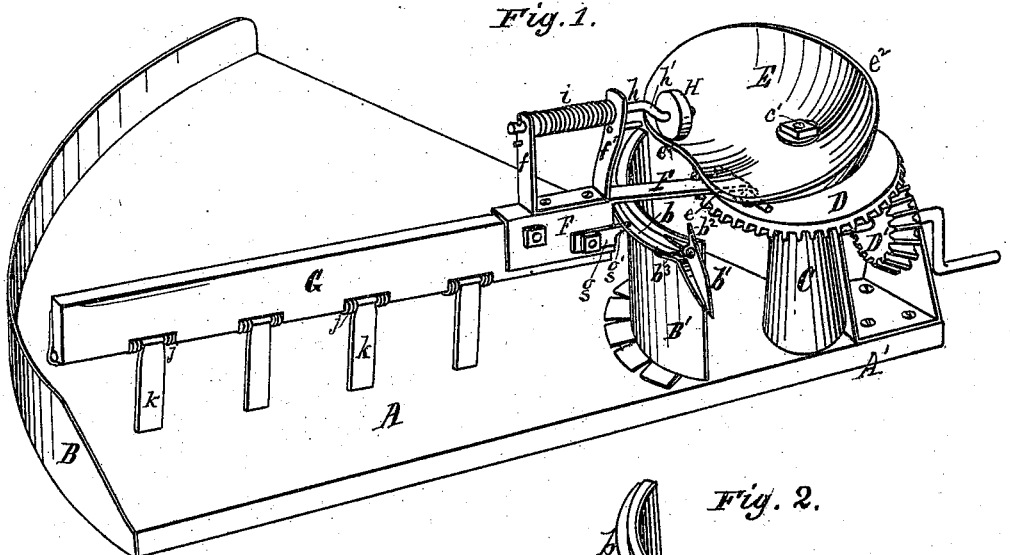
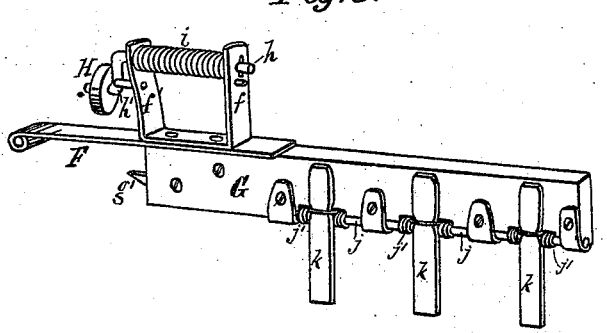
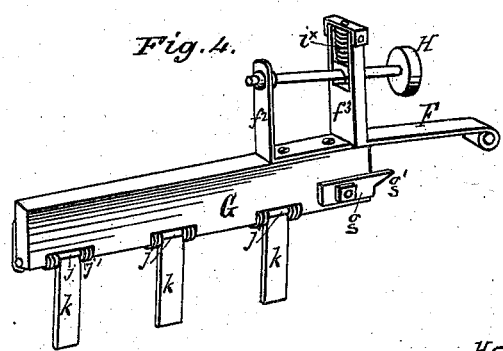
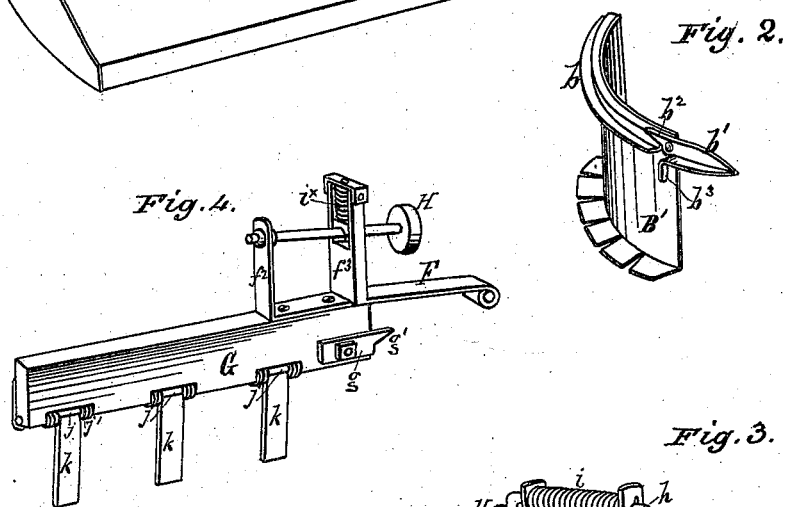
Witnesses:
Edmund Masson
John G. Center
Inventor:
Paul S. Burditt
by A. M. Smith
Attorney.

UNITED STATES PATENT OFFICE.

PAUL S. BURDITT, OF HORNELLSVILLE, NEW YORK, ASSIGNOR OF ONE-HALF HIS RIGHT TO OTHNIEL PRESTON, JR., OF SAME PLACE.

IMPROVEMENT IN HARVESTER-RAKES.

Specification forming part of Letters Patent No. 174,189, dated February 29, 1876; application filed December 18, 1875.

*To all whom it may concern:*

Be it known that I, PAUL S. BURDITT, of Hornellsville, county of Steuben, State of New York, have invented certain new and useful Improvements in Harvester-Rakes, of which the following is a full, clear, and exact description, reference being had to the accompanying drawings, making part of this specification, in which—

Figure 1 is a perspective view of a harvester platform, with my improvements applied; Fig. 2 is a perspective view of the inner grain-board with its fixed guide-rail and pivoted finger; Fig. 3 is a perspective view of the rake-head, &c., showing the manner of attaching the rake-teeth; and Fig. 4 shows a modification in the means for connecting the yielding roller with the rake heads or arms.

Similar letters of reference denote like parts wherever used.

My invention relates to the improvement of that class of raking attachments known as a combined rake and reel and to the construction of the rake itself, and consists, first, in the combination, with the rake and reel arms and a single unvarying cam-track or way, of means for changing the path of the rake and reel arms, adapting them to act as reel-arms only, and to act also as rakes when desired without changing the path of the rollers connecting said arms and with the guiding-cam. It further consists in a novel manner of uniting the rake-teeth to the rake-heads, whereby they are adapted to yield to heavy obstructions such as stumps, stones, or badly-tangled grain, which, being too heavy to be moved by the light teeth employed, are liable to break the latter and to injure or destroy the rake.

In the accompanying drawings, A represents a grain-platform, of the usual quadrant form, and provided at its sides or ends with the usual curved fenders or guards B B'.

The platform, or platform-bar, has its inner end extended beyond the guard B', adapting it to be connected with the machine-truck, or the platform may be connected through the finger-bar with the machine-frame in any usual or preferred manner. Upon this inner extended end A' is secured the rake-standard C, of any suitable construction, and provided at its upper end with a fixed stud or shaft, $c'$, upon which the bevel or crown wheel and rake-head D is mounted, and to which motion is imparted through a bevel-wheel, D', from any suitable shaft or wheel on the machine-truck, and by any preferred arrangement of gearing or chain and band or sprocket wheels. Upon the upper end of the fixed shaft or stud $c'$, above the crown-wheel, is secured a fixed cam, E, made by preference in the form of an irregularly-shaped bowl, the outer rim of which varies at different points from an undulating horizontal position, as at $e\ e^1$, to a vertical or nearly vertical position, as at $e^2$, according to the varying position it is desired the reel-arms shall assume in passing around the stud or shaft $c'$, for adapting it to pass over the platform and machine, and for picking up the grain and presenting it to the cutters and depositing it upon the platform. To the upper face of the crown-wheel D a series of rake and reel arms, F, (only one of which, however, is shown,) are pivoted, to the outer ends of which the rake-heads G are united in any usual manner. The upper face of the arms F have lugs or uprights, $f f^1$, formed upon or attached to them, in the upper ends of which, upon each arm, is mounted a rock-shaft, $h$, provided at its inner end with a crank-arm, $h^1$, armed with a friction-roller, H, which rests upon and travels around the upper outer face of the cam E. The rock-shaft $h$, between the uprights $f f^1$, is surrounded by a coiled spring, $i$, united at one end to said shaft and at its other end to one of the uprights, said spring being so arranged as to serve by its tension to hold the crank $h^1$ down against a stop on upright $f^1$, with the roller H at its nearest point of approach to the arm F, as shown in Fig. 3. By this arrangement the arm F is held up in close proximity with the lower face of the cam or cam-rim, and may be provided, if desired, with a small friction-roller moving in contact therewith for relieving the friction.

The inner curved guard or fender B', upon its inner or stubble side, is provided with a horizontal flange, ledge, or rail, $b$, extending from the front to the rear or discharging end of the platform, as shown, and to the forward end of this rail is pivoted an angular or flanged latch or finger, $b^1$, forming a pivoted forward extension of said rail. The vertical rib or portion of this finger is made tapering from rear to front, terminating with the horizontal part in a point at its forward end. This vertical portion is extended behind the pivot, and forms a spur, $b^2$, which, when the finger or latch is in a horizontal position, rests in a socket in the rail or ledge $b$. The horizontal portion of the finger at its rear end, and at or near the transverse vertical plane of the pivot is bent downward, forming a second spur, $b^3$, the purpose of these spurs being hereinafter explained. Upon the rake head or arm is secured an adjustable plate or arm, $g$, which projects inward from the rake-head in the form of a spur, $g'$, which, if desired, may be provided with a friction-roller, so located upon the rake-arm as to be in the same vertical plane with the ledge or rail $b$ when the rake-arm reaches or passes over the forward end of said rail.

The operation of the parts thus described is as follows: Supposing the finger $b^1$ to be in the horizontal position shown in Fig. 2, when, in the revolution of the rake-arm, the roller H enters the depression at $e$ in the cam E, for enabling the rake-heads to pick up the grain, and present it to the cutters, the spur $g'$ passes under the horizontal flange or portion of the finger $b^1$, and when the roller H rises over the inclined portion between $e$ and $e^1$ of the cam E, the rake-arm is prevented from rising with it, the crank-arm $h^1$ overcoming the tension of the spring $i$, and permitting the roller to rise while the rake-arm yields to the grasp of the ledge $b$. The further movement of the rake-head brings the spur $g'$ into contact with the spur $b^3$ on finger $b^1$, and rocking the latter on its pivot causes it to assume the position shown in Fig. 1, while the spur $g'$, remaining and moving under the curved ledge $b$, causes the rake to sweep the platform, the tension of the spring $i$ lifting the rake out of the grain as soon as the spur $g'$ reaches the end of the ledge or rail $b^1$. The finger $b^1$ being now turned down out of the way, as described and as shown in Fig. 1, the succeeding rake-heads will be lifted by the incline from $e$ to $e^1$ in the cam E before the spur $g$ reaches the ledge $b$, and, consequently, such arms will act as reel-arms only until another arm, provided with a spur, $g'$, in passing over the ledge $b$ strikes the upper spur $b^2$, and resets the finger $b^1$ for causing the next arm to act as a rake. Thus, the spur $g'$ is made upon one arm to set the finger $b^1$ to cause the succeeding arm to act as a rake-arm, while the same spur on the rake-arm turns the finger $b^1$ to allow the arms to act as reel-beaters only. Thus, if but one arm is used, it will act in one revolution as a rake-arm, and the succeeding revolution as a reel or gathering-arm, and so on alternately. If two arms are used they will act, the one as a rake, and the other as a reel-arm, and if four arms are employed they may act alternately as rake and reel arms; or, the reel-arm in advance of the rake-arm may be provided with the spur $g'$, for setting the finger $b^1$, which, the rake-arm acting upon in its turn, again turns out of the path of the succeeding arms, as described.

The finger $b^1$, in practice, will be held by a spring in either position to which it is turned by the spur $g'$, said spring being applied either to the pivot or at the rear of the finger, and resting alternately against one of two faces placed at, or nearly at, right angles to each other, or any convenient arrangement of spring may be used for the purpose.

In Fig. 4 a modification is shown in the manner of applying the roller H to the rake-head. Thus, instead of its being applied to a crank-arm, it is mounted on the inner end of a vibrating arm, $h^2$, hinged to the outer standard $f^2$, and passing through a vertical slot in standard $f^3$, a spring, $i^x$, serving to hold the arm at the lower end of said slot, with the roller at its nearest point of approach to the rake-arm, but allowing said rake-arm to yield or be drawn away from the roller when acted upon by the finger $b^1$ and ledge $b$, as described.

The operation of these parts will be readily understood.

From the foregoing description it will be seen that with an unvarying cam, and with a guiding-roller following said cam in an unvarying path, the rake and reel arms are made to pursue the different paths adapting them to the performance of their respective functions.

The finger $b^1$, besides being operated automatically by the rake and reel arm, as described, may also, by means of a cord, or cord and treadle, be operated by the driver, either for withdrawing the finger out of the path of the arms intended to act as rake-arms, or for setting it to act upon arms designed to act as reel-arms only, as preferred.

The rake-head G may be of any usual or preferred construction, except that to its lower edge a rod, $j$, is rigidly connected, extending the whole or nearly the whole length of said head. Upon said rod, at suitable distances apart, and within recesses formed in the lower edge of the head, are placed springs $j'$ formed by coiling the ends of a wire around the rod in such manner as to leave an intermediate loop for the reception and retention of the tooth $k$. The ends of the spring rest against the lower face of the rake-head, and the teeth being inserted into the loops in front of the rake-head, with the spring under tension, said springs serve to hold the teeth in working position, with the projecting upper ends resting against the forward face of the head, as shown, but allowing them to yield in the event of their striking against a stump, stone, or other heavy obstruction, such as would be liable to break them. After the obstruction is passed the teeth are immediately restored, by the action of the spring, to their former working position.

Instead of attaching the ledge $b$ to the guard B', an independent support therefor may be used, if preferred, and instead of the single spur $g'$, adapted to act on the finger $b^1$, according to whether it is placed on a reel or a rake arm, a shorter spur may be used on the rake-arm for depressing said finger only. These, however, are merely obvious mechanical equivalents.

Having now described my invention, what I claim as new, and desire to secure by Letters Patent, is—

1. The combination, with the rake or rake and reel arms, of yielding guiding-rollers, adapting the said arms to vary their path without changing the path of the rollers, substantially as described.

2. The combination of the rake and reel arms provided with the yielding or spring guiding-roller with the single cam E, arranged and operating substantially as described.

3. The guide rail or way $b$ provided with the pivoted latch or finger $b^1$, in combination with the fixed guiding-cam E and the rake-arms, operating substantially as described.

4. The latch or finger $b^1$ pivoted to the forward end of the curved horizontal rail or way $b$, and operated by the rake and reel arms, for automatically changing the path of said arms, substantially as and for the purpose described.

5. In a harvester-rake, the removable teeth $k$ hinged to the rake-head, and held to their work by means of springs $j'$, substantially as and for the purpose described.

PAUL S. BURDITT.

Witnesses:
A. M. SMITH,
JOHN G. CENTER.